US007008700B1

(12) United States Patent
Goodson et al.

(10) Patent No.: US 7,008,700 B1
(45) Date of Patent: *Mar. 7, 2006

(54) ARCHITECTURAL LAMINATE PANEL WITH EMBEDDED COMPRESSIBLE OBJECTS AND METHODS FOR MAKING THE SAME

(75) Inventors: Raymond Lynn Goodson, Sandy, UT (US); R. Talley Goodson, Salt Lake City, UT (US); Boyd T. Goodson, Salt Lake City, UT (US)

(73) Assignee: 3-Form, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/821,307

(22) Filed: Apr. 9, 2004

Related U.S. Application Data

(63) Continuation-in-part of application No. 10/465,465, filed on Jun. 18, 2003, and a continuation-in-part of application No. 10/086,269, filed on Mar. 1, 2002, now abandoned.

(60) Provisional application No. 60/389,392, filed on Jun. 18, 2002, provisional application No. 60/273,076, filed on Mar. 5, 2001.

(51) Int. Cl.
*A47G 29/093* (2006.01)

(52) U.S. Cl. .................. 428/542.2; 428/339; 428/335; 428/336; 428/332; 428/480; 428/483; 428/13; 17/18; 17/55; 17/542.6

(58) Field of Classification Search ................ 428/339, 428/335, 336, 332, 480, 483, 13, 17–18, 428/22, 542.6
See application file for complete search history.

(56) References Cited

U.S. PATENT DOCUMENTS

| | | | |
|---|---|---|---|
| 5,643,666 A | 7/1997 | Eckart et al. ............... | 428/339 |
| 5,894,048 A | 4/1999 | Eckart et al. ............... | 428/339 |
| 5,958,539 A | 9/1999 | Eckart et al. ............... | 428/46 |
| 5,998,028 A | 12/1999 | Eckart et al. ............... | 428/383 |
| 6,025,069 A | 2/2000 | Eckart et al. ............... | 428/339 |
| 2003/0113485 A1 | 6/2003 | Schober ...................... | 425/13 |

*Primary Examiner*—Ling Xu
(74) *Attorney, Agent, or Firm*—Workman Nydegger

(57) ABSTRACT

A decorative laminate panel comprises compressible objects embedded inside, wherein the compressible objects would be flattened in unnatural shapes under conventional processes. For example, an exemplary decorative laminate product comprises thatch reed, willow reed, bamboo, weeds, grasses, twigs and branches of a tree or bush, beans, and so forth. In at least one exemplary implementation of the present invention, an extruded sheet, such as PETG or polycarbonate, is softened and melted around the compressible materials such that the compressible materials do not deform. Imperfections in the decorative laminate panel can be easily removed, thereby allowing for producing a high quality decorative laminate panel with high efficiency and relatively low cost compared with conventional methods and materials.

19 Claims, 5 Drawing Sheets

ARCHITECTURAL LAMINATE PANEL WITH EMBEDDED COMPRESSIBLE OBJECTS AND METHODS FOR MAKING THE SAME

This application is a continuation-in-part of U.S. patent application No. 10/465,465, filed on Jun. 18, 2003, entitled "Laminate Structure with Polycarbonate Sheet and Method of Making", which claims priority of U.S. Provisional application Ser. No. 60/389,392, filed Jun. 18, 2002, entitled "Lamination of Polycarbonate to Dissimilar Materials and Method for Making Same". The parent U.S. patent application (10/465,465) is also a continuation-in-part of U.S. patent application Ser. No. 10/086,269, filed on Mar. 1, 2002, now abandoned, entitled "Laminated Article and Method of Making Same", which claims the benefit of priority to U.S. Provisional Patent Application No. 60/273,076, filed on Mar. 5, 2001, entitled "Lamination of Dissimilar Materials and Method for Making Same".

BACKGROUND OF THE INVENTION

1. The Field of the Invention

This present invention relates generally to decorative laminate products and processes, for use in architectural design.

2. Background and Relevant Art

Recent architectural designs have focused on decorative laminate panel products, such as glass or laminate products, which can be used as decorative windows, and as partitions in offices and homes. In particular, decorative laminate panels are now particularly popular compared with decorative glass panels since decorative laminate panels can be manufactured to be more resilient, and to have the same appearance as glass but with less cost. Furthermore, decorative laminate products (or "laminate products", or "laminates") more readily enable a recent trend in architectural design of embedding decorative objects within the decorative laminate panel product.

Present laminate products generally used for creating decorative laminate panels comprise polyvinyl chloride, acrylic, poly(methylmethacrylate) or "PMMA", poly(ethylene-co-cyclohexane 1,4-dimethanol terephthalate) or "PETG", as well as related polycarbonates. While each of the aforementioned laminates can serve as an appropriate glass substitute, each laminate material varies in physical properties from one material to the next. For example, polycarbonates, PETG, and PMMA are generally received for use in solid sheet form (i.e., extruded). An extruded sheet is generally a solid preformed sheet, such as a solid 4'x8' PETG sheet (alternatively, 3'x 5' sheet, 5'x10' sheet, etc.), which ultimately can form a surface of a decorative laminate panel when the panel is in final form. By contrast, acrylic materials used in decorative panels are generally handled in liquid form. The different physical properties ultimately have a result on the manufacturing cost, as well as the ultimate look of the clear product, depending on the application.

To embed decorative objects inside extruded sheets, two or more extruded sheets are pressed and heated around the decorative objects. The final decorative product therefore typically comprises two viewable surfaces of the final decorative laminate panel inside of which can be viewed the decorative objects. Due, however, to the conventional pressure (e.g., 80–100 psi) used to press and set the decorative laminate panel, extruded decorative laminate panels are suited primarily for embedding flat objects, such as flattened leaves, ferns, cutout designs, fabrics, and so forth. Extruded panels, however, are also suited for embedding fairly rigid three-dimensional materials, such as crushed glass or rocks that can withstand the conventional pressure (80 psi or greater).

It would be impossible, however, to embed compressible objects (i.e., relatively soft objects, such as objects that would flatten at pressures of 80 psi or greater), such as thatch, willow reed, straw, coffee beans, twigs, bamboo, and so forth having any measurable diameter, in extruded sheets using the pressure of conventional processing methods. In particular, compressible natural objects would not carry their natural appearance in the final decorative laminate panel since they would be flattened under conventional pressure. Furthermore, when the compressible objects are compressed between the extruded sheets, air bubbles can form that are very difficult to remove. This can result in air bubbles that are easy to see inside the decorative laminate panel, as well as imperfections on the surface of the decorative laminate panel.

By contrast, acrylic decorative panels do not use pressure that would otherwise crush compressible objects. Furthermore, acrylic panels do not have the same difficulty with air bubbles that would be common with decorative laminate panels made by embedding objects between extruded sheets. For example, liquid acrylic can be cast around flat, rigid, or soft and compressible objects, by pouring the liquid acrylic around the desired objects, and then solidifying the acrylic into a hardened panel. The liquid acrylic generally forces out air as it moves around the object. As such, acrylic panels can include a wider variety of objects embedded inside, whether flat, rigid, or soft and compressible natural objects. In particular, the hardened acrylic panel therefore can be viewed having a wide variety of objects inside that have not been flattened, and hence maintain a three-dimensional shape.

Unfortunately, acrylic is not an ideal material for creating decorative panels for use in architectural design. For example, acrylic panels are not every resistant to cracking or shattering compared with some decorative laminate panels made from extruded sheet materials, such as extruded PETG sheets. Furthermore, acrylic panels have a fairly high error rate due to the process of casting (pouring and setting), and are thus more inefficient to produce. For these and other reasons, cast acrylic panels are also much more expensive compared with extruded PETG laminate panels.

Accordingly, an advantage in the art can be realized with decorative laminate panels that combine the benefits of casting materials with the benefits of extruded sheet materials. In particular, an advantage in the art can be realized with decorative laminate panels that have the advantages of being able to embed compressible objects inside the panel without air bubbles, and without significantly flattening the compressible objects. Such decorative laminate panels should also have the advantages of resiliency, ease of manufacture, and should be relatively low in cost.

BRIEF SUMMARY OF THE INVENTION

The present invention solves one or more of the foregoing problems in the art with processing methods that allow compressible objects to be embedded in extruded laminate materials without flattening the objects, and without significantly trapping air. In particular, novel processing methods allow compressible objects, such as thatch, willow reed, coffee beans, bamboo, and similar objects to be embedded within opposing, extruded laminate sheets.

In one exemplary implementation, compressible objects are arranged on a first extruded laminate sheet. The compressible objects are arranged so that one or more passageways between the compressible objects allow air to escape in the forming process. A second extruded laminate sheet is then positioned against the compressible objects so that the compressible objects are set between opposing first and second laminate sheets in a laminate sheet assembly.

The laminate sheet assembly is ultimately placed in a compression chamber and subjected to a relatively low first pressure of up to approximately 10 psi. Temperature is then elevated to a first elevated temperature, such that the laminate sheets begin to soften. The laminate sheet assembly is then subjected to a relatively higher second pressure of up to approximately 40 psi. The temperature is also then elevated to a second elevated temperature, such that the compressible objects begin to sink into the opposing first and second laminate sheets without significantly flattening. Remaining steps in the process subject the laminate sheet assembly to relatively high pressure of up to approximately 100 psi, and temperature of up to approximately 240 degrees so that the laminate sheet assembly can be pressed into final form. When the laminate sheet assembly is cooled, a final product is formed that comprises the compressible objects in a relatively uncompressed, or natural, state, relatively free of visibly trapped air.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to both methods and systems that allow compressible objects to be embedded in extruded laminate materials without flattening the objects, and without significantly trapping air. In particularly, processing methods as detailed herein allow compressible objects, such as thatch, willow reed, coffee beans, bamboo, and similar objects to be embedded within opposing, extruded laminate sheets.

As used herein, "compressible objects" refers to three-dimensional objects that substantially deform at pressures up to 80–90 psi. That is, each "compressible" object can be thought of as having a "critical pressure". For the purposes of this specification and claims, "critical pressure" refers to the pressure at which the structural integrity of the object collapses, such that the object splits, cracks, or otherwise compresses into an unnatural conformation. There are, of course, varying grades of collapse, or compression, for any given compressible object, such that an "unnatural conformation" may mean that an object has compressed to 90% of its thickness in one direction, 75% of its thickness in one direction, and so on. Most generically, therefore, compressible objects will be understood to fill a modicum of three-dimensional space, such as objects that would otherwise appear unnaturally shaped when collapsed a given amount. Furthermore, the term "compressible" is relative to the extruded sheet materials, and related temperatures and pressures. Hence, for extruded PETG materials, compressible objects will be understood as having a critical pressure of up to approximately 92 psi using conventional thermosetting processes.

Figure 1A:
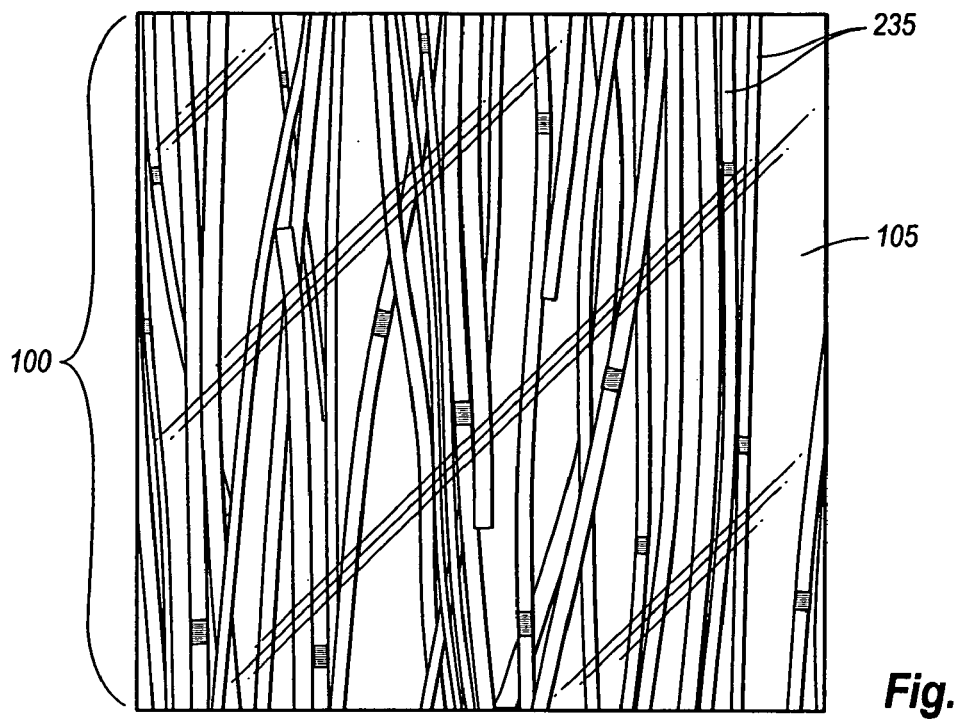
FIG. 1A illustrates a plan view of a surface of an exemplary implementation of a final product of the present invention in which thatch reed is embedded in a single image layer.

FIGS. 1A–1F provide an overview of exemplary embodiments of final decorative laminate panels 100, 110, and 120 in accordance with aspects of the present invention. In particular, FIG. 1A illustrates a surface view of an exemplary implementation of a final product of the present invention in which thatch reed is embedded between two extruded laminate sheets. As shown, a finalized laminate panel 100 product can comprise a viewable surface 105 and a cross section 107 (see FIG. 1B). In addition, as will be detailed herein, the laminate panel depicted in FIG. 1A is properly understood to be a single image layer. That is, the single image layer comprises only a single layer of embedded objects 235.

Since the laminate panel is generally transparent or translucent on both sides (although this is not required), each viewable side of the panel can be properly referred to as the viewable surface 105. By contrast, the cross section 107 (FIG. 1B) will be understood for the purposes of this specification and claims to refer to the depth or thickness of the laminate panel 100, which is generally perpendicular to the viewable surface 105. These distinctions between viewing sides and cross sections are consistent for FIGS. 1C through 1F.

Figure 1B:
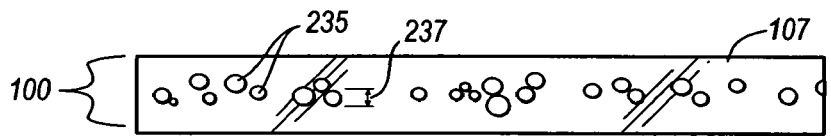
FIG. 1B illustrates a cross-sectional view of FIG. 1A.

Generally, the embedded objects 235 will be positioned within the laminate panel 100 so that the objects are interposed between an oriented in a plane that is roughly parallel with the opposing viewable surfaces 105. This is typically true for more elongate objects, such as thatch, willow reed, and so forth; whereas, less elongate objects, such as coffee beans, may align in the plane, or in a rotated position relative to the plane. In any case, a cross section of the embedded objects 235 can also generally be viewed when viewing the cross section 107 of the laminate panel 100. In FIG. 1A, the embedded objects 235 are natural elongated materials, such as thatch, bamboo, or willow reed. Furthermore, as shown in FIG. 1B, the cross section 107 of the panel 100 shows that the embedded objects 235 in panel 100 are relatively uncompressed when the panel 100 is in final form. As such, their respective diameters 237 are substantially the same as prior to being embedded in the panel 100.

Figure 1C:
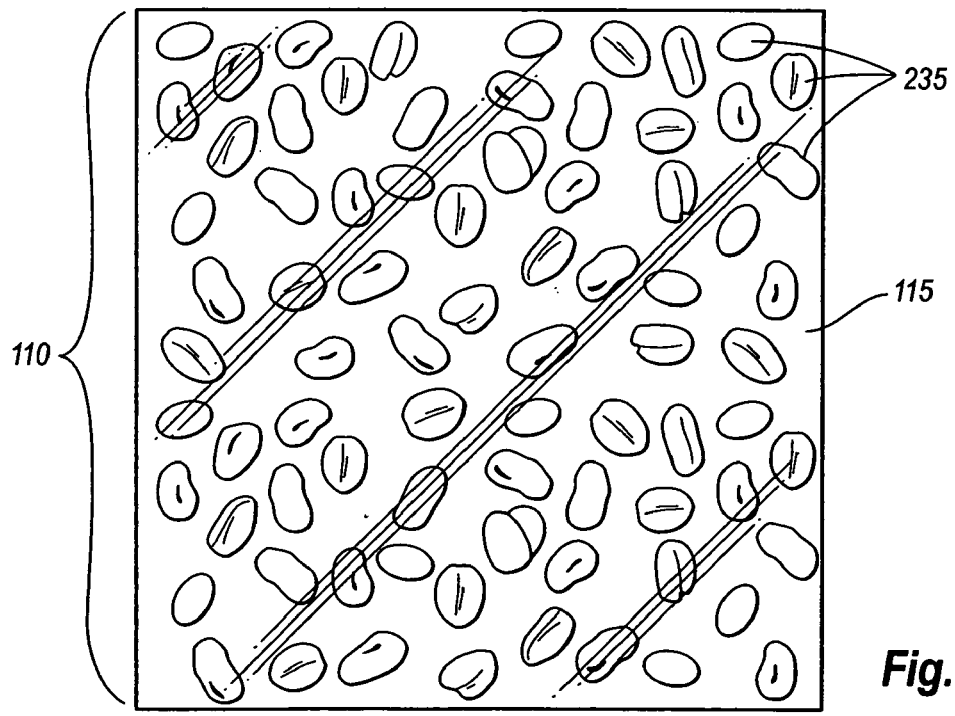
FIG. 1C illustrates a plan view of a surface of an exemplary implementation of a final product of the present invention in which coffee beans are embedded in a single image layer.
Figure 1D:
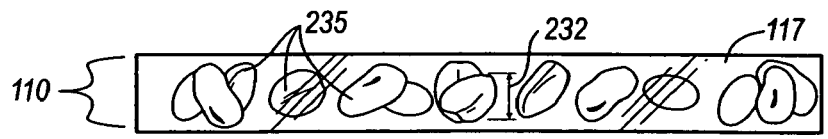
FIG. 1D illustrates a cross-sectional view of FIG. 1C.

FIG. 1C illustrates a surface view of an exemplary implementation of a final product of the present invention in which decorative beans, such as coffee beans, are the embedded objects 235 within laminate panel 110. The laminate panel 110 further has a viewable surface 115, and a cross section 107 (see FIG. 1D), which further depicts corresponding views of the embedded objects 235. FIG. 1C, therefore, shows a single image layer of a different implementation of embedded objects 235 compared with FIG. 1A. Furthermore, as shown in FIG. 1D, the cross section 117 of the panel 110 shows that the embedded objects 235 in panel 110 are relatively uncompressed. As such, the respective diameters 232 of the embedded objects 235 are substantially the same as prior to being embedded in the panel 110.

Figure 1E:
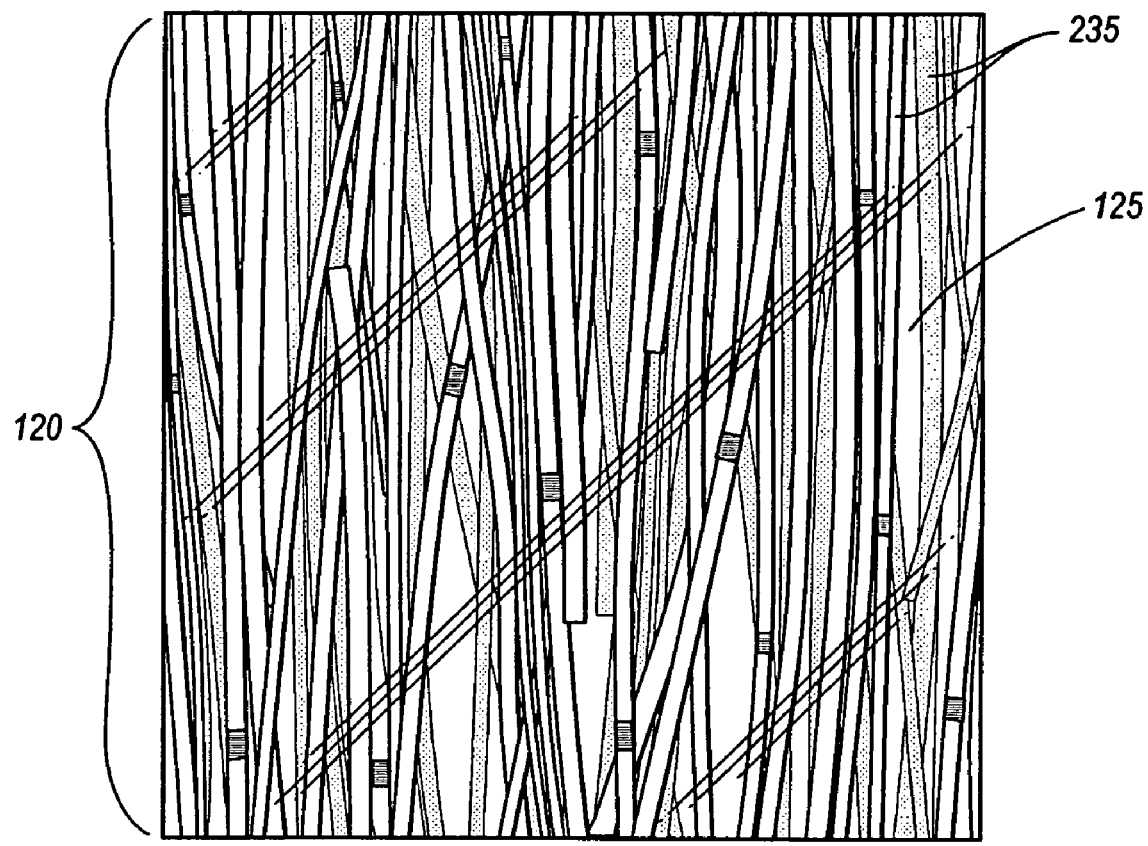
FIG. 1E illustrates a plan view of a surface of an exemplary implementation of a final product of the present invention in which thatch reed is embedded between multiple image layers.
Figure 1F:
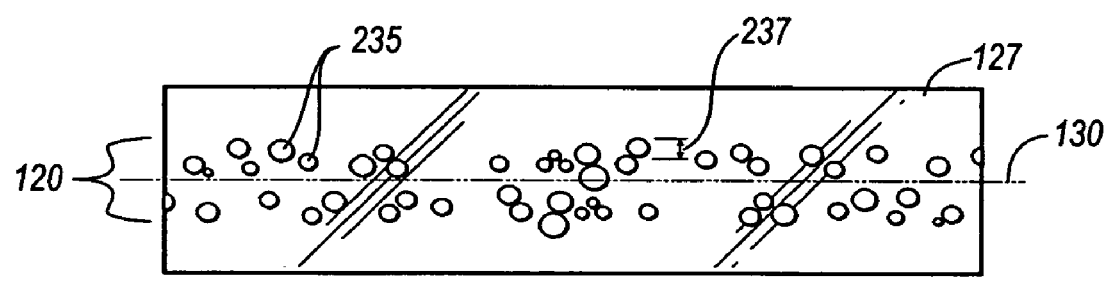
FIG. 1F illustrates a cross-sectional view of FIG. 1E.

FIG. 1E illustrates a surface view of an exemplary implementation of a final product of the present invention in which thatch reed, as in FIG. 1A, is embedded in multiple layers of a laminate panel 120. The laminate panel 120 further has a viewable surface 125, and a cross section 127 (see FIG. 1F). In particular, FIG. 1E is distinguished from FIGS. 1A through 1D at least for having two or more image layers being bisected by an imaginary plane 130. Because of the multiple image layers, the viewable surface 125 of panel 120 therefore contrasts with the viewable surface 105 of panel 100 by having a greater density of embedded objects 235. Furthermore, the cross section 127 of the panel 120 shows that the embedded objects 235 in panel 120 are relatively uncompressed, and are not split or cracked. As such, their respective diameters 237 are substantially the same as prior to being embedded in the panel 120.

Figure 2A:
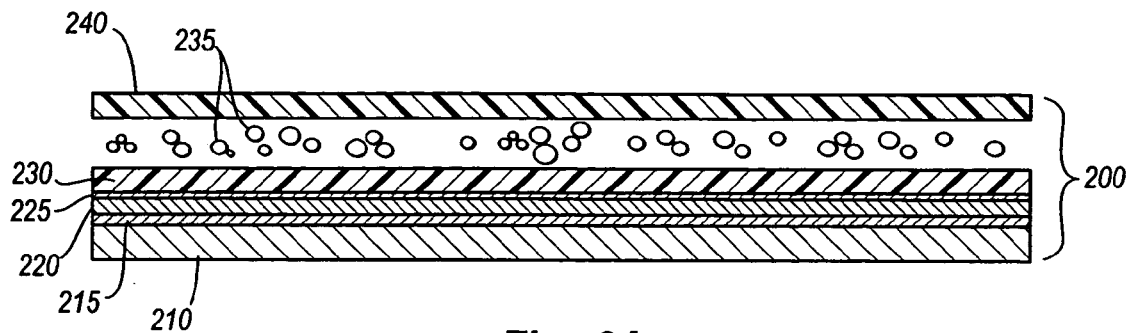
FIG. 2A illustrates a partially exploded, cross-sectional view of a laminate sheet assembly for use in accordance with an implementation of the present invention.
Figure 2B:
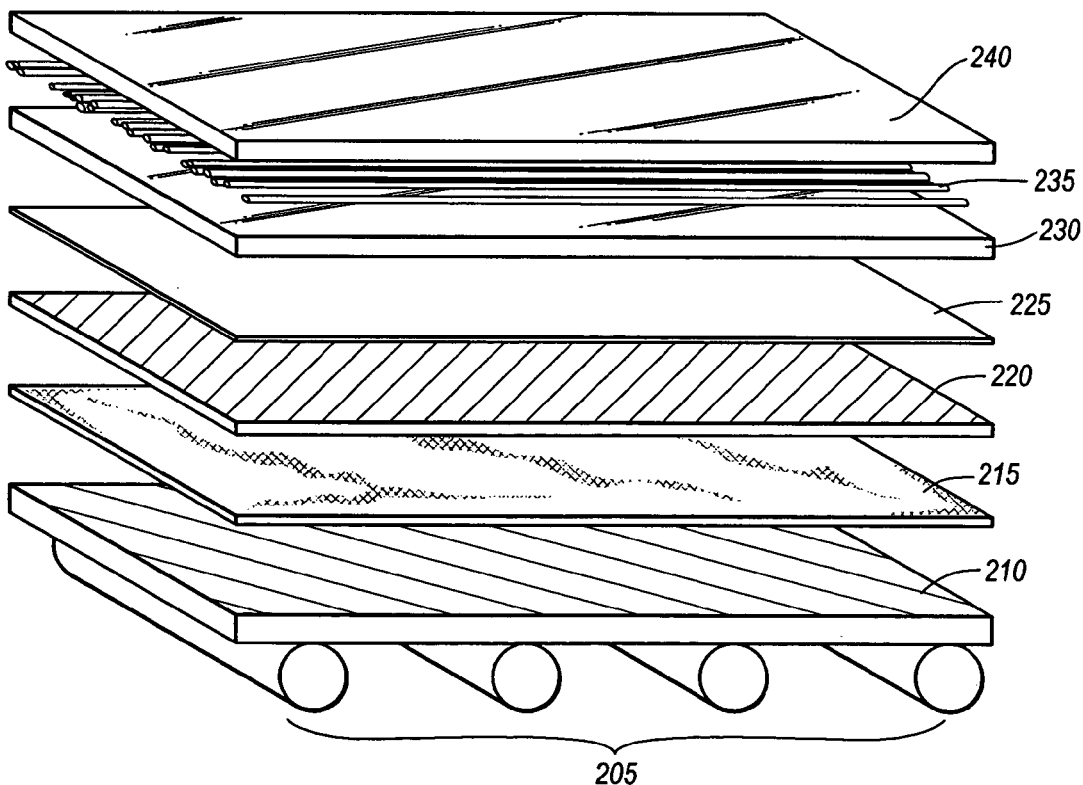
FIG. 2B illustrates an exploded perspective view of a sequence for positioning components of the laminate sheet assembly in FIG. 2A in accordance with an exemplary implementation of the present invention.

FIG. 2A illustrates an overview of a laminate sheet assembly 200 for use in accordance with an exemplary implementation of the present invention. While FIG. 2B illustrates a sequential overview for positioning components of the laminate sheet assembly 200 in FIG. 2A, albeit rotated by 90°. As shown, a laminate sheet assembly 200 has a bottom layer 210 that will be used to guide the laminate sheets and embedded objects 235 into a thermosetting press (not shown), such as a stationary press. The process of sending a laminate assembly 200 through a stationary press to form a final product is described in greater detail in U.S. Pat. Nos. 6,025,069, 5,998,028, 5,958,539, 5,894,048, and 5,643,666, each of which is incorporated herein.

In at least one implementation, the bottom layer 210 is a metal plate, such as a steel or aluminum plate having a thickness of approximately 2 mm. Because the metal plate 210 is subject to repeated stresses from continual direct contact with the stationary press platens (not shown), metal plate 210 is typically not a perfectly flat surface. Accordingly, it can be useful to use a soft, albeit heavy duty, next layer which is generally a pressure pad 215 positioned on top of the metal plate 210. The pressure pad 215 can be useful to help equalize the pressure on, and temperature of, the remaining layers, thereby helping form a highly uniform surface of the decorative laminate panel in final form. The pressure pad 215 preferably comprises a compressible fabric prepared from copper, silicone, or NOMEX®, or a combination of the preceding. NOMEX® is an aramid fabric available from DuPon de Nemours, E.I. & Company.

A flexible metal plate 220, such as a flexible aluminum plate of approximately 20–140 mm (508 to 3556 microns), is then placed on top of the pressure pad 215. Although the metal plate 220 is flexible, the metal plate 220 is preferably a substantially smooth, flat surface. A paper layer 225 (e.g. acrylic paper) is also then placed against the flexible metal plate 220. Preferably, the paper layer 225 comprises an adhesive surface (e.g., acrylic adhesive, not shown) on at least one side. The adhesive surface of the paper 225 is positioned facing away from the flexible metal plate 220, such that the adhesive surface will adhere to the next layer, the extruded sheet 230. As such, the paper layer 225 will removably adhesive to the final decorative product during the setting process, and can be peeled away from the decorative laminate panel when the decorative laminate panel is ultimately put to use. The paper layer 225 therefore provides a layer of surface finish to the corresponding extruded sheet 230 (and 240, if appropriate).

A first laminate sheet 230 is then positioned on top of the paper layer 225. In at least one exemplary implementation of the present invention, the first laminate sheet 230 (as well as the second laminate sheet 240) comprises transparent or translucent extruded copolyesters containing repeating units of terephthalic acid residues (e.g., PETG), ethylene glycol residues, and cyclohexanedimethanol residues.

The first and second laminate sheets 230 and 240 can also comprise extruded polycarbonate. The term "polycarbonate" refers generally to thermoplastic, aromatic polymers including homopolycarbonates, copolycarbonates, copolyestercarbonates and mixtures thereof having average molecular weights of between approximately 8,000 amu (atomic mass units) and 200,000 amu. Preferably, polycarbonates for use with some implementations the present invention have molecular weights of between approximately 20,000 amu and 80,000 amu, and have an instrinsic viscosity (I.V.) of approximately 0.40 to approximately 1.5 dl/g as measured in methylene chloride at approximately 25° C.

The first and second laminate sheets 230 and 240 each have a thickness of generally between approximately 0.1 inches and approximately 0.2 inches, depending on the desired thickness of the final decorative laminate panel. For example, a relatively thin decorative laminate panel will comprise a single image layer of two laminate sheets each having a thickness of approximately 0.118 inches. While on the other hand, a thicker decorative laminate panel will comprise a single or double image layer of two or more laminate sheets each having a thickness of approximately 0.177 inches. Additional considerations for choosing thinner or thicker first and second laminate sheets 230 and 240 can depend on the thickness of the embedded objects 235 placed inside.

Embedded objects 235 can then be positioned against the first laminate sheet 230. For the purposes of this specification and claims, the term "embedded objects" refers to any objects that are intended to be, or have already been, embedded in a decorative laminate panel, such as any organic and inorganic materials. In addition, "embedded objects" comprises any organic or inorganic materials that can be construed as "compressible objects".

For the purposes of this specification and claims, organic materials will be understood to comprise any natural or synthetic decorative materials, such as thatch, bamboo, tree or bush branches or stems, will reed, leaves, beams (e.g., coffee beans), and so forth. The foregoing list, however, is not intended to be exhaustive, but merely illustrative of the type of materials that can be used in accordance with the present invention, and that otherwise would not be suitable for use in conventional thermosetting processes. Similarly, inorganic materials, by contrast, can comprise may natural or synthetic items, such as rock, glass, other types of minerals, and so forth. Such inorganic items will ordinary be crushed so that the final decorative product does not exceed a desired thickness, or thinness, and to make sure the final panel has a smooth, uniform surface (e.g., viewable surfaces 105, 115, 125). The thickness of either organic or inorganic materials will be between approximately 0.05 and approximately 0.5 inches.

In any case, embedded objects 235 are prepared to ensure no quality loss in the decorative laminate panel surface, or to the embedded objects 235 themselves. For example, a manufacturer will generally ensure that the randomly-placed objects do not form completed shapes, such as, for example, a completed circle or square. Completed shapes would otherwise trap air in the decorative laminate panel, and can result in surface imperfections, sometimes referred to as "lakes", on the surface of the decorative laminate panel surface (e.g., 105, 115, 125). In some cases, the like can appear as a slightly shinier portion of the decorative laminate surface compared with the remainder of the surface. Furthermore, the manufacturer can make sure the embedded objects 235 have been dried sufficiently, to prevent complications due to moisture exiting the object 235. As well, the manufacture can also apply a fungicide or bacterial agent to the embedded objects 235 to remove growths that could potentially damage the embedded objects 235 in the final product.

With the embedded objects 235 positioned appropriately, the manufacturer can them position a second laminate sheet 240 against the embedded objects 235, such that the embedded objects 235 are surrounded on two sides by opposing laminate sheets 230 and 240. As shown in FIGS. 2A and 2B, the assembly 200 forms a single image layer. If the manufacturer intends only to create a single image layer, then the preceding layers of paper 225, metal sheet 220, and so forth are added to the opposing side of the second laminate sheet 240 prior to sending the assembly 200 through a stationary press. On the other hand, if the manufacturer desires to create multiple image layers, preceding steps are merely repeated iteratively as desired into a larger stack. Hence, a double image layer will comprise two sets of first and second laminate sheets 230 and 240 stacked together, at triple image layer will comprise three sets of first and second laminate sheets 230 and 240 stacked together, and so on.

Figures 3A, 3B:
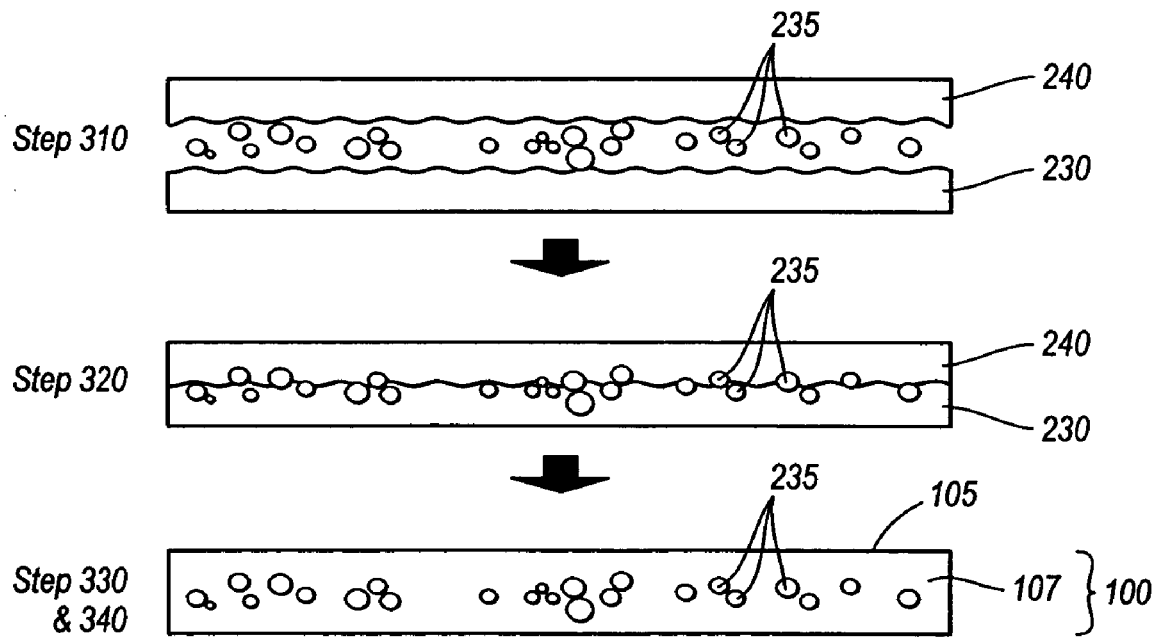
FIG. 3A illustrates a chart of processing steps and corresponding pressure and temperature ranges for implementing a process for forming a decorative laminate panel product in accordance with an exemplary implementation of the present invention.
FIG. 3B illustrates a sequence of physical changes in a single-layered laminate assembly when the single-layered laminate assembly undergoes inventive process steps as exemplified in FIG. 3A.

FIG. 3A illustrates a chart of primary processing steps and corresponding pressure and temperature ranges for implementing a process for forming a decorative laminate panel. The temperatures and pressures illustrated in FIG. 3A are specific to extruded PETG sheets, and extruded copolyester sheets having similar properties. One reason PETG and related materials are particularly useful with the present invention is that they have a melting point that renders them particularly suitable for embedding materials that would otherwise collapse at conventional pressures, or that otherwise be destroyed at conventional temperatures.

In addition, PETG panels are resilient, resistant to cracking and other stresses that would damage other materials. By contrast, while polycarbonate is also a similarly strong material, extruded polycarbonate has a higher melting point that extruded PETG. As such, embedded materials 235 for use with extruded polycarbonate would need to be chosen that have melting points higher than the appropriate range for extruded polycarbonate, and that are of sufficient integrity as not to be destroyed in the thermosetting process. Thus, though there may be some variance in choosing embedded materials to fit the properties of a given extruded sheet material, the processes in accordance with the present invention can be applied to a broad range of extruded and embedded materials.

By way of the explanation and not of limitation, PETG and related copolyesters include a polyethylene terephthalate polyester modified with 2 mole % to 99 mole % of cyclohexanedimethanol repeat unit. The cyclohexanedimethanol may be either the 1,4- or 1,3-isomer and may be either in the cis- or trans- form or a mixture of the isomers. The copolyester may be semi-crystalline or amorphous, preferably amorphous.

The copolyester contains repeat units from a dicarboxylic acid and a diol, based on 100 mole % dicarboxylic acid and 100 mole % diol. The dicarboxylic acid component contains at least 80 mole % of terephthalic acid or dimethylterephthalate. The copolyester may optionally be modified with up to 20 mole % of one or more different dicarboxylic acids other than terephthalic acid or dimethylterephthalate such that the total dicarboxylic acid content is equal to 100 mole %. Examples of other dicarboxylic acids which may be used with terephthalic acid include phthalic acid, isophthalic acid, 1,4-, 1,5-, 2,6-, and 2,7-naphthalenedicarboxylic acid, 1,3-, 1,4-cyclohexanedicarboxylic acid, cyclohexanediacetic acid, oxydibenzoic acid, 4,4-biphenyldicarboxylic acid, succinic acid, glutanic acid, glutaric acid, adipic acid, azelaic acid, sebacic acid, suberic acid, pimelic acid, and 1,12-dodecanedioic acid. The copolyester may be prepared from one or more of the above dicarboxylic acids.

It should be understood that use of the corresponding acid anhydrides, esters, and acid chlorides of these acids is included in the term "dicarboxylic acid".

The diol component contains repeat units from 98 to 1 mole % ethylene glycol and 2 to 99 mole % 1,4-cyclohexanedimethanol and/or 1,3-cyclohexanedimethanol. The cyclohexanedimethanol may be present as the cis or trans isomer or mixtures thereof. In addition, the diol component can optionally be modified with up to 20 mole % of one or more different diols other than ethylene glycol and cyclohexanedimethanol such that the total diol content is equal to 100 mole %. the additional diols include cycloaliphatic diols having 6 to 16 carbon atoms and aliphatic diols having 3 to 16 carbon atoms.

Examples of diols which may be used with ethylene glycol and cyclohexanedimethanol include diethylene glycol, triethylene glycol, propane-1,3-diol, butane-1,4-diol, pentane-1,5-diol, hexane-1,6-diol, 3-methylpentanediol-(2, 4), 2-methylpentanediol-(1,4), 2,2,4-trimethylpentane-diol- (1,3), 2-ethylhexanediol-(1,3), 2,2-diethylpropane-diol-(1, 3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The copolymer may be prepared from one or more of the above diols. The copolyesters may also be modified with polyethylene glycols or polytetramethylene glycols to enhance elastomeric behavior.

As used herein, the related copolyester also has an inherent viscosity of 0.5 to 1.2 dL/g. Preferably, the copolymer has an inherent viscosity of 0.6 to 0.9 dL/g as measured at 25° F. using 0.50 grams of polymer per 100 ml of a solvent consisting of 60% by weight phenol and 40% by weight tetrachloroethane. It is especially preferred that the copolyester be prepared from or derived from repeating units consisting of terephthalic acid units, ethylene glycol units and 1,4-cyclohexanedimethanol units.

Figure 3C:
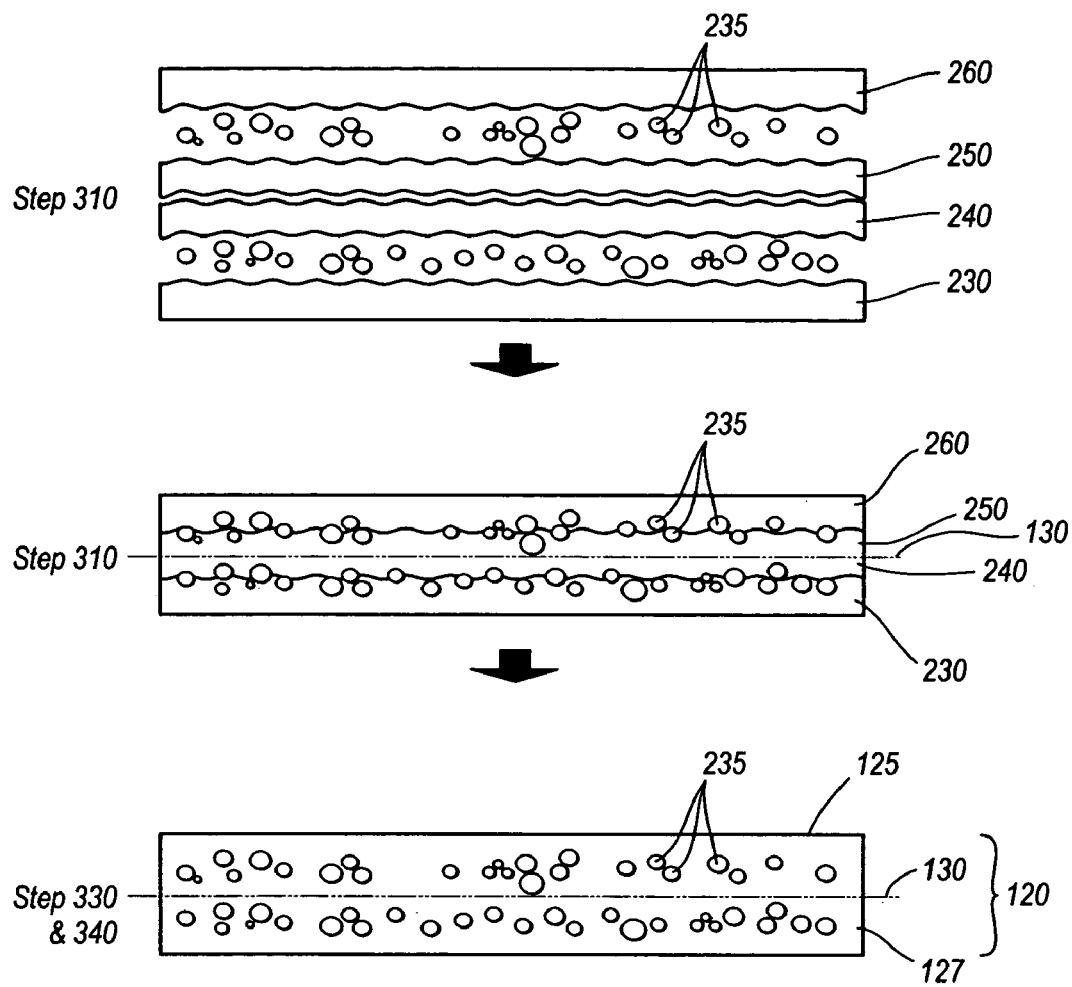
FIG. 3C illustrates a sequence of physical changes in a two-layered laminate assembly when the two-layered laminate assembly undergoes inventive process steps as exemplified in FIG. 3A.

Referring again to the figures, steps 310, 320, 330, and 340 are described with respect to the illustrations of FIGS. 3B and 3C. In particular, FIG. 3B illustrates a sequence of physical changes in a single-layered laminate assembly when the single-layered laminate assembly undergoes process steps 310, 320, 330, and 340. Similarly, FIG. 3C illustrates a sequence of physical changes in a multi-layered laminate assembly when the two-layered laminate assembly undergoes process steps 310, 320, 330, and 340.

As previously indicated, a manufacturer places the laminate assembly 200 in a thermosetting environment (e.g., stationary press) so that the laminate assembly 200 can undergo a series of pressure and temperature changes. In a first step 310, for example, a manufacturer can apply between approximately 5 to 10 psi of pressure on the laminate assembly 200, and raise the temperature from between approximately 70° F. to approximately 180° F. As illustrated in FIGS. 3B and 3C, the first and second laminate sheets 230 and 240 (as well as sheets 250 and 260 for multiple layers, etc.) begin to soften around the embedded materials 235. In addition, air between the laminate sheets preferably begins to evacuate as the laminate sheets compress together during step 310. At this temperature and pressure, however, the embedded materials 235 are unlikely to be enveloped entirely by either of the first or second laminate sheets 230 and 240.

The manufacturer can then perform a second step 320 of raising the pressure to between approximately 30–40 psi, and raising the temperature between approximately 180° F. and approximately 230° F. As illustrated in FIGS. 3B and 3C, therefore, the first and second laminate sheets 230, and 240 (as well as sheets 250 and 250 for multiple layers, etc.) soften sufficiently that the embedded materials 235 are completely enveloped by the corresponding opposing first and second laminate sheets. Preferably, air between the laminate sheets has then completely evacuated from the laminate assembly 230, such that the laminate assembly 200 becomes substantially free of air.

The manufacturer then finalizes the decorative laminate panel in steps 330 and 340, whereby the laminate assembly 200 is pressed into final form 330, and then cooled 340. For example, in step 330, the manufacturer can raise the pressure to approximately 92 psi, and raise the temperature to between approximately 230° F. and approximately 240° F. The manufacturer holds this temperature and pressure for a time of up to approximately 5 minutes or less, until the assembly 200 is pressed into final form. Thereafter, the manufacturer cools the laminate assembly 200 to a temperature approaching 70° F., and removes the final, hardened decorative laminate panel 100 (or 120) from the stationary press, and from the metal trays (e.g., 210, 220) of the laminate assembly 200. Cross sectional views 107 and 127 of the corresponding decorative laminate panel 100 and 120 show that the embedded materials 235 have been substantially preserved such that they have not been significantly crushed in the laminating process.

Of course, the manufacturer can also adjust the foregoing temperatures and pressures, as described herein, in order to suit the melting points of other extruded materials. With respect to extruded polycarbonate, for example, the manufacturer may adjust the temperatures described for the table in FIG. 3A by adding approximately 120° F. to many of the higher-end temperatures.

As such, step 310 would comprise implementing a pressure of approximately 5–10 psi on an extruded polycarbonate assembly, and raising the temperature from approximately 70–80° F. to approximately 300° F. Furthermore, step 320 would comprise implementing a pressure of approximately 30–40 psi on the extruded polycarbonate assembly, and raising the temperature from approximately 300° F. to 350° F. Step 330 would comprise implementing a pressure of approximately 92 psi, and raising the temperature from approximately 350° F. to approximately 360° F. And step 340 would comprise holding a pressure of approximately 92 psi on the polycarbonate assembly, and reducing the temperature from 360° F. to as low as approximately 70°–80° F. Of note, the low end values of 70°–80° are typically lowest approximations of a final or initial cooling value, and may be higher or lower as appropriate without affecting the quality of the decorative laminate product.

Accordingly, one will appreciate that the foregoing pressure and temperature values for extruded PETG sheets and extruded polycarbonate sheets are merely exemplary implementations of the invention. Even further, the previously described temperatures are each, nevertheless, only an approximate value existing within a range of ± approximately 15°–20° F. As such, a manufacturer need not ensure that the temperatures and pressures of a given process reach the previously described pressures and temperatures exactly. In particular, the manufacturer need only ensure that the temperatures and pressures of a given process are in a suitable range for softening and melting the respective extruded sheet materials about the corresponding embedded objects 235.

In any case, and regardless of the material and process values implemented, the manufacturer then reviews the decorative laminate panel 100, 120 and observes the product for trapped air, which can be evidenced by surface lakes. The manufacturer, however, can easily remove the lakes by sending the now-hardened, decorative product back through the stationary press one or two more times, as necessary. As such, there is relatively little need to discard errant decorative laminate panels, which thereby enhances the production efficiency for the decorative laminate panels. Thus, the foregoing apparatus and processes in accordance with the present invention allow for a large volume of decorative laminate panels to be created with a relatively low error rate.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A decorative architectural panel comprising:
   one or more compressible objects suspended between two extruded resin sheets formed together about the one or more compressible objects using a plurality of pressures in a thermosetting process, at least one of the plurality of pressures being greater than or equal to a critical pressure sufficient to otherwise compress the one or more compressible objects to an unnatural appearing conformation;
   wherein the one or more compressible objects maintain a substantially natural appearing conformation between the two formed resin sheets.

2. The panel as recited in claim 1, wherein the first and second extruded sheets are at least partially translucent.

3. The panel as recited in claim 1, wherein the decorative laminate panel has a thickness of between 0.25 and 2 inches.

4. The panel as recited in claim 1, wherein at least one of the first and second extruded sheets comprise extruded PETG having a thickness of between 0.1 inches and 0.50 inches.

5. The panel as recited in claim 1, wherein at least one of the first and second extruded sheets comprise extruded polycarbonate having a thickness of between 0.1 inches and 0.50 inches.

6. The panel as recited in claim 1, wherein at least one of the first and second extruded sheets has a width and length dimensions of approximately 3'×5' approximately 4'×8°, or approximately 5'×10'.

7. The panel as recited in claim 1, wherein at least one of the first and second extruded sheets comprises a copolyester that has a melting point between 180° F. and 230° F. in a pressure range of up to 40 psi.

8. The panel as recited in claim 1, wherein the one or more compressible objects comprise any one or more of bamboo, beans, straw, a tree branch, a tree twig, a bush branch, a bush twig, or any other object having a natural diameter that is substantially compressed at a critical pressure between about 10 psi and about 100 psi.

9. The panel as recited in claim 1, wherein a viewable surface of the decorative laminate panel is substantially uniform from one end to the next such that no lakes or air bubbles are exposed.

10. The panel as recited in claim 1, wherein the one critical pressure is less than about 92 psi for the one or more compressible objects.

11. The panel as recited in claim 10, wherein the critical pressure is greater than about 10 psi, such that the one or more compressible three-dimensional objects ordinarily appear to have an unnatural conformation when subjected to the critical pressure of between about 10 psi and 92 psi.

12. The panel as recited in claim 10, wherein the unnatural appearance comprises a substantially flattened appearance for the one or more compressible three-dimensional objects when viewed through the first or second extruded sheet.

13. A laminate sheet assembly configured to create the decorative architectural panel recited in claim 1 when the laminate assembly is subjected to the plurality of pressures in the thermosetting process comprising:
   the first extruded sheet;
   the one or more three-dimensional objects arranged on the first extruded sheet; and
   a second extruded sheet positioned about the one or more embedded objects;
   wherein the one or more three-dimensional objects are arranged in a position between the first and second extruded sheet such that sufficient air escapes from between the embedded objects as pressure is increased, such that lakes or air bubbles are avoided when the first extruded sheet and second extruded sheet are formed together.

14. The laminate sheet assembly as recited in claim 13, further comprising a pressure pad positioned about one of the first and second extruded sheets.

15. The laminate sheet assembly as recited in claim 13, wherein the first and second extruded sheets comprise PETG.

16. The laminate sheet assembly as recited in claim 13, wherein the first and second extruded sheets comprise polycarbonate.

17. The decorative architectural panel as recited in claim 1, wherein the one or more compressible objects comprise thatch or willow reed.

18. The decorative architectural panel as recited in claim 1, wherein the one or more compressible objects comprise bamboo.

19. A decorative architectural resin panel comprising:
   first and second extruded resin sheets formed together with a plurality of pressures, at least one of the one plurality of pressures being greater than a critical pressure at which one or more three-dimensional objects ordinarily collapse to a substantially unnatural conformation; and
   an image layer positioned between the first and second extruded sheets that are formed together, the image layer comprising the one or more three-dimensional objects in a substantially natural conformation;
   wherein the one or more three-dimensional objects of the image layer maintain an appearance of the substantially natural conformation despite having been subjected to the critical pressure.

* * * * *

UNITED STATES PATENT AND TRADEMARK OFFICE
CERTIFICATE OF CORRECTION

PATENT NO. : 7,008,700 B1 Page 1 of 1
APPLICATION NO. : 10/821307
DATED : March 7, 2006
INVENTOR(S) : Raymond Lynn Goodson et al.

It is certified that error appears in the above-identified patent and that said Letters Patent is hereby corrected as shown below:

Column 4
Line 28, change "particulary" to --particular--

Column 6
Line 32, change "adhesive to --adhere--

Column 7
Line 15, change "will" to --willow--
Line 21, change "may" to --any--
Line 39, change "like" to --lake--

Column 9
Line 50, change "250 and 250" to --250 and 260--
Line 55, change "230" to --200--

Column 11
Line 28, change "4'x8°" to --4'x8'--
Line 44, remove [one]

Column 12
Line 11, before "second" change "a" to --the--
Line 39, remove [one]

Signed and Sealed this

Fifteenth Day of August, 2006

JON W. DUDAS
*Director of the United States Patent and Trademark Office*